Dec. 30, 1952   N. F. COOK ET AL   2,623,707
LINE-RETRIEVING REELING APPARATUS
Filed Aug. 31, 1950   2 SHEETS—SHEET 2

Norbert F. Cook,
Paul Walla,
Inventors.
By Haynes and Koenig,
Attorneys.

Patented Dec. 30, 1952

2,623,707

UNITED STATES PATENT OFFICE 2,623,707

LINE-RETRIEVING REELING APPARATUS

Norbert F. Cook and Paul Walls, St. Louis, Mo., assignors to Lincoln Engineering Company, St. Louis, Mo., a corporation of Missouri Application August 31, 1950, Serial No. 182,594

6 Claims. (Cl. 242—86)

This invention relates to line-retrieving reeling apparatus, and more specifically to air-pressure-operated reeling apparatus of this class, particularly hose-retrieving reeling apparatus such as may be mounted on the ceiling or a wall for retrieving lubricant, air or water hose in filling stations, garages et cetera.

This invention involves improvements in a type of line-retrieving reeling apparatus having a reel rotation of which for retrieving a line wound on the reel is effected by an expansible-chamber air motor comprising a cylinder and a piston in the cylinder. In this type of apparatus, the line is withdrawn by manually pulling it, this causing rotation of the reel in unreeling direction, and thereby causing movement of the piston relative to the cylinder in one direction. Upon release of the line for reeling, air pressure in the cylinder drives the piston back in the other direction for rotating the reel to wind up the line. Examples of such apparatus are those shown in U. S. Patents 2,221,566, 2,499,909 and 2,279,156.

Heretofore, in the above-mentioned type of apparatus, provision has been made either for completely venting the cylinder to atmosphere upon pulling out the line, to avoid having the piston work against any pressure, or for having the piston work against a relatively large enclosed volume of air without any venting upon pulling out the line to avoid building up excessive pressure against the piston. Otherwise, it takes too much force completely to unwind the line. In the non-venting case, unless the volumetric displacement of the piston is small relative to the total volume of air subject to compression by the piston, the force opposing unwinding becomes greater and greater as more line is unwound, and more and more force is required to pull out the line. A further requirement is that the pressure on the piston for any angular position of the reel is adequate to effect reeling when the reel is released for winding up the line, and this conflicts with the requirement for ease of operation in pulling out the line.

This invention provides reeling apparatus of the type described wherein provision is made for positively establishing and maintaining substantially constant air pressure in the cylinder for any position of the piston, this pressure being such that the line may be easily unreeled with a nice "feel," inasmuch as unreeling is effected against the substantially constant pressure and may be accomplished by pulling out the line with a pull of substantially constant force, the pressure also being such that upon release of the line, substantially constant force is applied to rotate the reel to wind up the line. A releasable reel latch is provided releasably to latch the line in any desired extended position, against the torque tending to rotate the reel in winding direction and a second latch is provided operable to latch the reel against rotation in unwinding direction in response to loss of pressure in the cylinder. Other features will be in part apparent and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawings, in which one of various possible embodiments of the invention is illustrated, Fig. 1 is a view in side elevation of a specific embodiment of the reeling apparatus of this invention, with the line fully retracted, parts being broken away and shown in section;

Similar reference characters indicate corresponding parts throughout the several views of the drawings.

Figure 1:
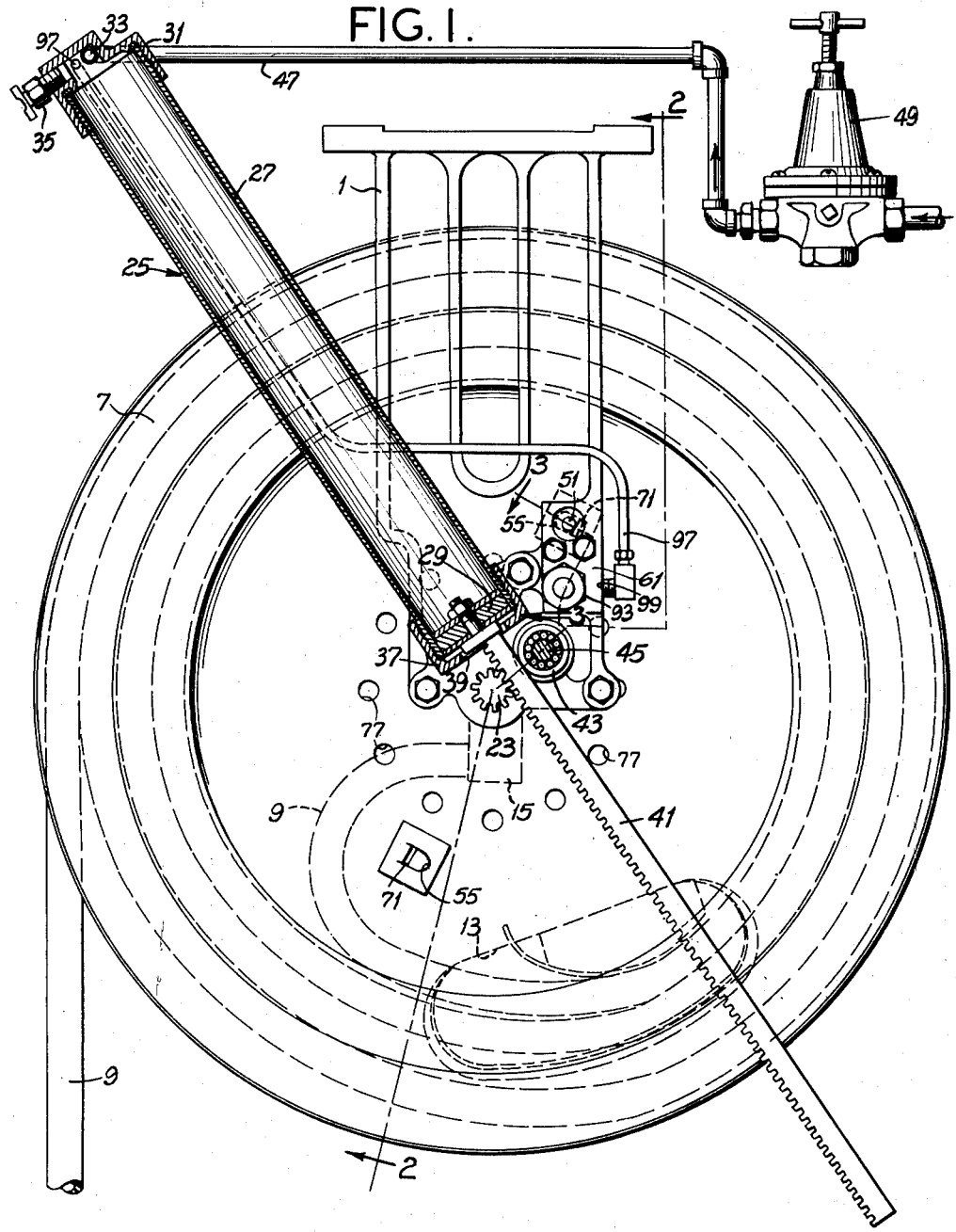

Referring to the drawings, which illustrate a specific embodiment of the reeling apparatus of this invention as it appears when ceiling-mounted, the apparatus is shown to comprise a support 1 having a bearing 3 for a reel shaft 5. A sheave-type reel 7 for reeling a hose line 9 is fixed to the shaft on one side of the support (its right side as viewed in Fig. 2). The reel has an annular hose-receiving channel 11. The hose extends through an opening 13 (see Fig. 1) in the side of the reel away from the support 1 and its inner end is coupled to a fitting 15 which is fitted in a radial opening 17 in the shaft. The hose is supplied with fluid (air, water, lubricant, etc.) through a swivel joint generally designated 19 connected into an axial passage 21 in the shaft and leading to the opening 17. The details of the swivel joint are not material as regards this invention and will not be particularly described. The shaft has a pinion 23 on its end opposite the swivel joint, outward of the bearing 3 and on the side of the support 1 opposite the reel.

The reel is adapted to be driven for reeling in the hose line by an expansible-chamber air motor generally designated 25. This motor comprises a cylinder 27 and a piston 29 reciprocable in the cylinder. One end of the cylinder is closed by a head 31 having an air inlet port 33 and a drain cock 35 for draining condensation. A cap 37 having an opening 39 is threaded on the other end of the cylinder, opening 39 making this end of the cylinder open to atmosphere. The piston movement is limited by a ball stop on the hose. The cylinder is mounted on the support 1 on the side opposite the reel in a plane transverse to the axis of the reel shaft 5 with its open end toward the pinion 23, and in position for a rack 41 extending from the piston through the opening 39 in cap 37 to mesh with the pinion. The rack is held in mesh with the pinion by a guide roller 43 journalled on a stud 45 extending from the support 1. The hose is wound on the reel in such direction that when the hose is pulled out, the reel 7, shaft 5 and pinion 23 rotate in such direction (counterclockwise as viewed in Fig. 1) as to drive the rack and piston toward the head end of the cylinder.

The cylinder 27 is supplied with air under pressure from a source of compressed air, such as is available where reeling apparatus of the type of this invention is used, through a supply system comprising an air line 47 connected to the inlet port 33 in the cylinder head 31 and including a combination pressure regulating and relief valve 49, which is adapted to maintain the pressure of air in the cylinder at a substantially constant value for any position of the piston 29. Valve 49 is of a dual-action type, having both a pressure-relieving action and a pressure-regulating action, and is set to maintain a predetermined pressure in the cylinder such as offers no substantial resistance to unwinding of the hose but which is sufficient to rotate the reel to reel in the hose. The action of the valve is such that when the piston is moved toward the head end of the cylinder, which would nominally have the effect of compressing the air in the cylinder and thus increasing the pressure in the cylinder, the excess pressure above the set, predetermined pressure is relieved. When the piston is moved away from the head end of the cylinder toward the open end of the cylinder, which would nominally have the effect of expanding the air in the cylinder and decreasing the pressure in the cylinder, the valve supplies sufficient pressure from the source to make up the deficiency and keep the pressure substantially constant at the set, predetermined pressure. The valve is adjustable to enable the setting of different predetermined pressures. The pressure supplied to the valve is higher than the predetermined pressure desired in cylinder 27 so that deficiencies in pressure in the cylinder can be made up.

Pressure regulating and relief valves of the above type are well known and commercially available, and hence no detailed description of valve 49 is necessary. In practice, a Norgren 2AX2 relieving type air regulating valve, manufactured by C. A. Norgren Company of Denver, Colorado, is suitable. This is set to maintain a pressure in the cylinder 27 such as offers no substantial impedance to pulling out the hose, yet which is sufficient to exert ample torque to rotate the reel to wind up the hose when the latter is released, taking into account the weight of the hose.

Figure 2:
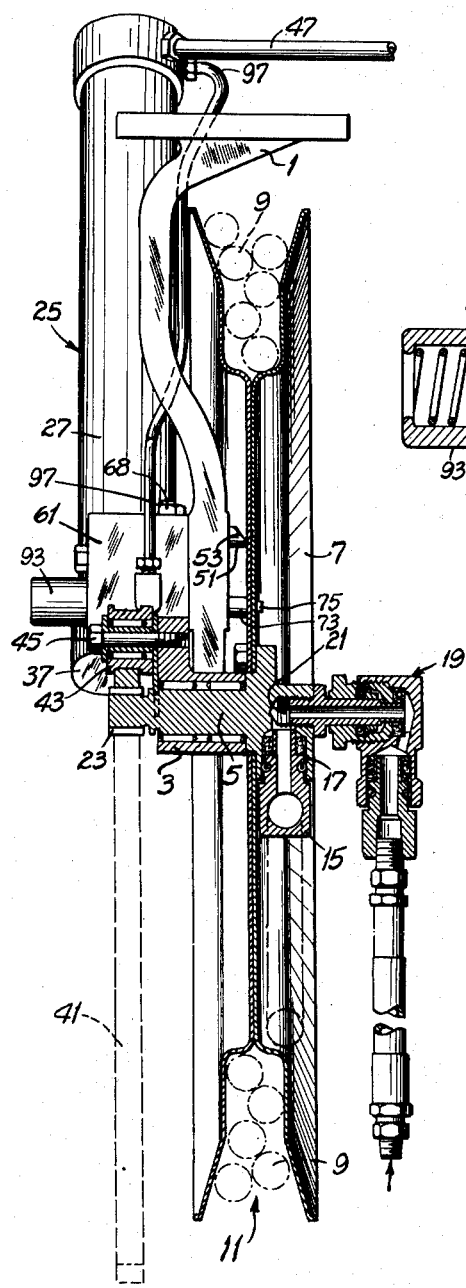
Fig. 2 is a section taken on line 2—2 of Fig. 1.

Since pressure of substantially constant value is maintained in cylinder 27, there is a substantially constant torque exerted on the reel 7 tending to wind up the hose in any angular position of the reel within its range of rotation. Accordingly, we provide a latch for releasably latching the reel against rotation in hose-winding direction substantially in any angular position to enable the hose to be pulled out to any desired length and the reel then latched against rotation in winding direction to prevent retraction of the hose. This latch, as illustrated, comprises a spring-biased latch pin 51 having a tapered nose 53 adapted for engagement in one of a number of detent openings 55 provided in the reel 7. As shown in Fig. 1, two such openings are provided, arranged on diametrically opposite sides of the axis of the reel shaft 5. The latch pin 51 is slidable in a bearing 57 in the support 1 parallel to the axis of the reel shaft at a radius corresponding to the radius of the openings 55, and extends through the support into an opening 59 in a block 61 fixed to the side of the support opposite the reel. The latch pin is biased toward the reel by a compression spring 63 reacting against a collar 65 on the pin from a seat 67 threaded in the end of opening 59. Rotation of the latch pin is prevented by a stud 68 threaded in an opening in the block 61 transverse to the opening 59 with the end of the stud reaching into a flat-bottomed groove 69 in the pin. This also limits axial movement of the pin. The nose of the pin is tapered on the trailing side of the pin as regards the direction of rotation of the reel in unwinding the hose, this direction being indicated by the arrow in Fig. 3, and the reel is provided with struck-out ears 71 at the corresponding trailing sides of the detent openings 55.

Figure 3:
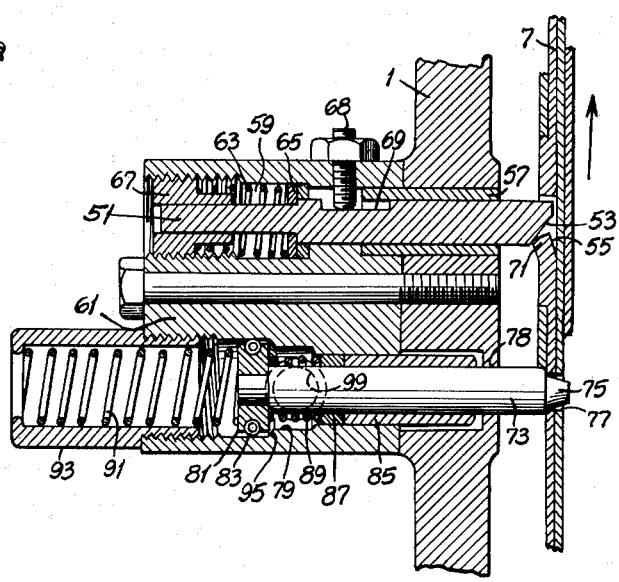
Fig. 3 is an enlarged ideal section taken on line 3—3 of Fig. 1.

The latch arrangement is such that when the hose is pulled out, thereby rotating the reel in unwinding direction indicated by the arrow in Fig. 3, ears 71 come into engagement with the taper of the nose of the latch pin, cam it away from the reel, and then pass on by the pin. Once a desired length of hose has been pulled out, to latch the reel, the pull on the hose is relaxed to the extent of allowing the reel slowly to rewind a short amount of hose until the latch pin engages in an opening 55. To retrieve the hose, once it has been latched in an extended position, the hose is pulled out far enough to disengage the pin from whatever opening 55 it had been engaged in, and the hose is then released to be wound up on the reel, which, when there is no substantial pull on the hose, rotates too fast for the pin to reengage in an opening 55. Thus it will be seen that the latch is a speed-governed latch, adapted to latch the reel against turning in winding direction if the reel is allowed to turn slowly by maintaining a pull on the hose line, and adapted to release the reel for automatically winding up the hose if the reel, after release of the latch, is allowed to turn rapidly by releasing the pull on the hose.

With the apparatus mounted in any position wherein the weight of the hose line (and the usual coupling or valve member on the outer end of the hose) tends to unwind the hose (as where the apparatus is ceiling or wall-mounted), if for some reason the air supply to the apparatus should fail and the pressure in cylinder 27 be lost, then the hose would completely unwind, inasmuch as there would be no substantial force opposing rotation of the reel in unwinding direction. In order to prevent such accidental unwinding of the hose, we provide a pressure-responsive latch for the reel which is maintained in a retracted position as long as there is pressure in the cylinder, and which operates upon loss of pressure in the cylinder to latch the reel against rotation in unwinding direction such as would otherwise occur due to the weight of the hose.

The pressure-responsive latch comprises a latch pin 73 having a tapered nose 75 adapted for engagement in any one of a number of detent openings 77 provided in the reel 7. As shown in Fig. 1, twelve such openings are provided, arranged in a circle having a smaller radius than the radius of openings 55. The pin 73 is slidable in an opening 78 in the support 1 parallel to the axis of the reel shaft at a radius corresponding to the radius of the openings 77. It extends through the support and into a cylindrical chamber 79 formed in the block 61. On the end of the pin within the chamber 79 is a piston 81 having a packing ring 83. The pin 73 is axially slidable in a sleeve 85 fixed in the end of the chamber 79 toward the reel. This end of the chamber is sealed by a packing ring 87 compressed against the inner end of the sleeve 85 by a compression spring 89 which surrounds the pin 73 and reacts from the piston 81 against the packing ring. This spring has the effect of biasing the piston 81 and pin 73 in the direction away from the reel. The piston 81 and the pin 73 are biased in the direction toward the reel by a compression spring 91 which reacts against the piston from the outer end of a spring retainer 93 threaded in the end of the chamber 79 away from the reel. Spring 91 exerts greater bias on the piston than spring 89 so that the net result is that the piston and the pin 73 are constantly spring-biased toward latching engagement with the reel. Movement of the piston toward the reel is limited by a step 95 in chamber 79 spaced from the packing ring 87.

The space between the piston 81 and the packing ring 87 is placed in communication with the cylinder 27 by an air line 97 connected at one end to a port in the cylinder head 31 and at its other end to a port 99 leading through the block 61 to this space. The arrangement is such that with pressure in the cylinder 27, there is sufficient pressure in chamber 79 between the packing ring 87 and piston 81 to hold the piston and the pin 73 in a retracted position wherein the nose 75 of the pin is clear of the reel. If pressure in the cylinder is lost, however, pressure on the piston 81 is also lost, and spring 91 thereupon biases the piston 81 and pin 73 into position for latching engagement of nose 75 in the nearest opening 77, as illustrated in Fig. 3, to prevent the hose from unwinding due to its own weight. The nose 75 is purposely tapered so that even if it should be in latching engagement in one of the openings 77, the hose may still be unwound by giving it a strong enough pull to cam the pin 73 away from reel-latching position. This makes it possible to pull out the hose, even though air pressure has been lost. The hose, however, cannot be retracted until air pressure is resupplied. When this occurs, the pressure moves the latch pin back to its retracted position.

Operation is as follows:

As long as the requisite predetermined air pressure is maintained in cylinder 27 and in the chamber 79 of the pressure-responsive reel latch, the latch pin 73 will be completely released, and the reel will be subject to torque tending to rotate it in hose-winding direction, even with the hose fully retracted. Assuming that the hose is fully retracted, the piston 29 will be at its fully extended position in cylinder 27 and rack 41 will be fully extended, as illustrated in Fig. 1. To use the hose, the user manually pulls it out, thereby rotating the reel, shaft 5 and pinion 23 in counterclockwise direction as viewed in Fig. 1. This results in driving the rack 41 and the piston 29 toward the head end of the cylinder 27 (its upper end as viewed in Fig. 1). Valve 49 relieves the cylinder of excess pressure which would otherwise result from the decrease of volume due to movement of the piston, and the pressure in cylinder 27 above the piston is maintained substantially constant at the requisite predetermined pressure as the piston moves upward. As the reel rotates in hose-unwinding direction, the ears 71 click by the latch pin 51.

When the desired length of hose has been withdrawn, and it is desired to latch the reel against rewinding the hose, the hose is allowed to rewind slowly to enable the latch pin 51 to come into latching engagement in the nearest detent opening 55 in the reel. Subsequently, to effect retraction of the hose, it is given a pull to disengage the latch pin 51, and then released to enable the reel to be rotated by the air motor at such speed that the latch pin 51 cannot engage in a detent opening 55. Or, if a greater length of hose is desired, the hose is simply further pulled out and the reel again latched against rewinding. Preferably, in effecting retraction of the hose, a grip should be maintained on the hose to prevent the reel from rotating too fast, while permitting it to rotate fast enough to avoid having latch pin 51 latch the reel.

If the air pressure in cylinder 27 should be lost, so that there is no substantial force opposing rotation of the reel in unwinding direction, latch pin 73 latches the reel against rotating in unwinding direction against the torque exerted by the hose itself tending to rotate the reel in unwinding direction. By having the tapered nose on pin 73, however, even upon failure of pressure, the hose may be pulled out for use by a relatively strong pull. In other words, the latching action of pin 73 is sufficient to latch the reel against rotation in unwinding direction for relatively low torque, but insufficient to latch it against rotation in unwinding direction for relatively high torque.

From the above, it will be seen that the invention provides a reliable line-retrieving reeling apparatus of such character that the line may be pulled out with a substantially constant pull throughout the entire extendible length of the line, and also of such character that relatively constant torque is exerted on the reel to rotate it in winding direction throughout its range of rotation.

In view of the above, it will be seen that the several objects of the invention are achieved and other advantageous results attained.

As many changes could be made in the above constructions without departing from the scope of the invention, it is intended that all matter contained in the above description or shown in the accompanying drawings shall be interpreted as illustrative and not in a limiting sense.

We claim:

1. Fluid-pressure-operated line-retrieving reeling apparatus comprising a reel for the line, an expansible chamber fluid motor coupled to the reel for rotating it in winding direction, a fluid pressure supply system for the motor including valve means for maintaining fluid under substantially constant pressure in the motor so as constantly to exert torque tending to rotate the reel in winding direction with the torque substantially the same for any angular position of the reel within its range of rotation, a latch for releasably latching the reel against rotation in winding direction substantially in any angular position of the reel, said latch being readily releasable to allow the reel to be rotated in winding direction by the motor to wind the line, and a second latch operable in response to loss of pressure in the system for latching the reel against rotation in unwinding direction.

2. Air-pressure-operated line-retrieving reeling apparatus comprising a reel for the line, an air motor comprising an air cylinder and a piston reciprocable in the cylinder geared to the reel for rotating it in winding direction, an air pressure supply system for the cylinder including a pressure regulating and relieving valve adapted to maintain air under substantially constant pressure in the cylinder for any position of the piston so as constantly to exert torque tending to rotate the reel in winding direction with the torque substantially the same for any angular position of the reel within its range of rotation, a latch for releasably latching the reel against rotation in winding direction substantially in any angular position of the reel, said latch being readily releasable to allow the reel to be rotated in winding direction by the motor to wind the line, and a second latch operable in response to loss of pressure in the system for latching the reel against rotation in unwinding direction.

3. Reeling apparatus as set forth in claim 2, wherein said second latch comprises a latch pin having a piston slidable in a pressure cylinder which is in communication with the cylinder of the air motor, the pin being movable into and out of latching engagement with respect to one of a series of detents provided on the reel, the pin being constantly biased toward latching engagement and adapted to be held out of latching engagement with the reel against the bias by pressure in said pressure cylinder.

4. Reeling apparatus as set forth in claim 2 wherein said second latch comprises a latch pin having a piston slidable in a pressure cylinder which is in communication with the cylinder of the motor, the pin having a tapered nose movable into and out of latching engagement with respect to one of a series of detent openings in the reel, the pin being biased toward latching position by a spring and adapted to be held out of latching position against the bias of the spring by pressure in said pressure cylinder.

5. Reeling apparatus comprising a support, a reel shaft journalled in a bearing in the support, a reel fixed on the shaft on one side of the support, a pinion on the shaft on the other side of the support, an air cylinder mounted on the support on the side opposite the reel in the plane of the pinion transverse to the axis of the reel shaft, a piston reciprocable in the cylinder, a rack extending from the piston through one end of the cylinder and meshing with the pinion, said one end of the cylinder being open and its other end being closed, a line wound on the reel in such direction that in unwinding the line the reel is rotated in such direction as to drive the rack and piston toward the closed end of the cylinder, said cylinder at its closed end being adapted for connection of an air pressure supply system including valve means for maintaining air under substantially constant pressure in the cylinder in the space between the piston and the closed end of the cylinder so as constantly to exert torque tending to rotate the reel in winding direction with the torque substantially the same for any angular position of the reel within its range of rotation, a latch for releasably latching the reel against rotation in winding direction substantially in any angular position of the reel, said latch being readily releasable to allow the reel to be rotated in winding direction by said torque to wind the line, and a second latch operable in response to loss of pressure in the space in the cylinder between its closed end and the piston for latching the reel against rotation in unwinding direction.

6. Reeling apparatus as set forth in claim 5 wherein said second latch comprises a latch pin mounted in the support for sliding movement parallel to the axis of the reel shaft and having a tapered nose adapted for engagement in one of a series of detent openings in the reel, a piston carried by said latch pin reciprocable in a chamber in said support, a spring biasing the latch pin in the direction toward the reel, and an air line connected to the cylinder at its head end and to the chamber on the side of the latch piston toward the reel, the arrangement being such that pressure communicated to said chamber from the cylinder holds the latch pin retracted from the reel against the bias of the spring, and, upon loss of pressure, the spring biases the pin to latching position.

NORBERT F. COOK.
PAUL WALLS.

REFERENCES CITED

The following references are of record in the file of this patent:

UNITED STATES PATENTS

| Number | Name | Date |
|---|---|---|
| 2,221,566 | Barks et al. | Nov. 12, 1940 |
| 2,494,525 | Steuart | Jan. 10, 1950 |
| 2,519,064 | Palm | Aug. 15, 1950 |